United States Patent Office 2,797,240
Patented June 25, 1957

2,797,240
METHOD OF PREPARING DICYCLOHEXYL-CARBODIIMIDE

Gaston Amiard, Noisy-le-Sec, René Heymes, Romainville, and Leon Velluz, Paris, France, assignors to UCLAF, Paris, France, a body corporate of France No Drawing. Application July 2, 1956,
Serial No. 595,101

Claims priority, application France September 15, 1955

5 Claims. (Cl. 260—551)

This invention relates to a method of preparing a carbodiimide. More particularly this invention relates to a method of making dicyclohexylcarbodiimide from dicyclohexyl urea which makes it possible to recover a considerable portion of the condensation material used in the process.

Dicyclohexylcarbodiimide

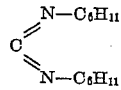

is of great interest as a condensation agent in the preparation of peptides. Its use, which was first described by Sheehan and Hess (J. Am. Chem. Soc., 1955, 77, 1066), permits the direct utilization of an amino acid whose amphoteric nature has been suppressed by blocking the amine function without it being necessary to convert it first into acid chloride or mixed anhydride. This reagent which fixes the water that is set free in the course of the reaction, is almost completely recovered in the form of dicyclohexylurea. Since dicyclohexylurea can be obtained very easily by the reaction of cyclohexylamine with urea, the new process makes it possible to use this raw material instead of the dicyclohexylthiourea used in the past, the preparation of which comprises the highly inflammable carbon disulfide as a reaction product.

With the above in view, it is an object of the invention to produce economically and safely a carbodiimide.

Another object of this invention is to produce dicyclohexylcarbodiimide in a relatively simple and safe manner.

Other objects and features of the invention will become apparent from the following illustrative but not limiting description.

In accordance with the present invention, the dicyclohexylurea is dehydrated by the action of p-toluene sulfochloride in the presence of a tertiary base, such as pyridine or methylethylpyridine, while being heated to about 70-80° C. Having been cooled, the pyridine salts (a mixture of chloride and p-toluene sulfonate) which have formed, are separated by the addition of a solvent, in which they are insoluble, such as petroleum ether. These resultant salts are filtered, the solvent is then evaporated and recovered, and the resultant dicyclohexylcarbodiimide is then recovered by rectifying under vacuum.

With the above general description in view, the following example illustrates the invention without, however, limiting its scope, the preparation of the raw material being given by way of indication only and not by way of limitation.

*Example for the preparation of dicyclohexylcarbodiimide*

30 grams of urea and 120 grams of cyclohexylamine are refluxed. During the reaction under reflux conditions, a voluminous precipitate initially forms, then two layers, and, finally, after 10 minutes a homogeneous solution forms. Gradually, as the heating progresses, the temperature of the reaction mixture, which, at the start, is held down by the reflux of the cyclohexylamine, rises and reaches 160° C. after two hours. At that moment a suddent solidification will be observed, whereupon the heating is discontinued, the solution is taken up with aqueous hydrochloric acid solution, is filtered, and the resultant dicyclohexylurea is washed with water, alcohol and ether. Having been dried, it is recrystallized in 100 cm.³ of absolute alcohol, finally producing 54 grams of dicyclohexylurea in the form of colorless needles having a M. P. of 234-235° C.

33.6 grams of the dicyclohexylurea prepared in the above manner, 50 cm.³ of pyridine and 28.5 grams of p-toluene sulfochloride are mixed together, stirred and heated for an hour and a half to 70-75° C. whereupon the heating is discontinued. Having been cooled, the mixture then separates into two different colored layers. 300 cm.³ of petroleum ether are added to the reaction mass, and from the mixture hydrochloride and pyridine p-toluene sulfonate crystallize. The pyridine salts are centrifuged, desiccated, and are washed over a filter with petroleum ether. The petroleum ether solutions are washed with water and are then dried over magnesium sulfate. In order to destroy the p-toluene sulfochloride which has not reacted, 2 cm.³ of diethylamine are added, and the solution is boiled for a quarter of an hour in the presence of vegetable black. This is followed by filtering the black, centrifuging it and evaporating until dry. The oily residue is rectified under vacuum. This produces 20 grams of crude dicyclohexylcarbodiimide passing at 130-136° under 3-4 mm. vacuum. By dissolving and new rectifying there is produced a pure product whose $E_{3-4\,mm.} = 131°$. The product has a M. P. of about 35°.

The yield from the above reaction equals about 15 grams which corresponds to about 50% of the theoretical yield.

From the foregoing it will be noted that there is disclosed a relatively simple and efficient process for the preparation of dicyclohexylcarbodiimide. This product has many uses in chemistry and medicine as an end product and as an intermediate in reactions with substances to synthesize drugs and the like for human and veterinarian use.

While one preferred example of making the product herein, has been described, it is to be understood that changes as to use and arrangement of materials or componets may be made without departing from the spirit and scope of the invention claimed herein.

We claim:

1. The process of preparing dicyclohexylcarbodiimide which comprises reacting p-toluene sulfochloride in the presence of a base selected from the group consisting of pyridine, methyl ethyl pyridine, dimethyl pyridine, diethyl pyridine, dipropyl pyridine, propyl ethyl pyridine, with dicyclohexylurea at a temperature between 70-80° C., cooling the resultant product, separating the basic salts, removing any unreacted p-toluene sulfochloride and finally obtaining the resultant dicyclohexylcarbodiimide.

2. The method of preparing dicyclohexylcarbodiimide which comprises reacting p-toluene sulfochloride in the presence of a tertiary base with dicyclohexylurea at a temperature ranging between 70 and 80° C., cooling, then separating the basic salts by addition of a solvent in which the salts are insoluble, removing the p-toluene sulfochloride which has not reacted, then evaporating the solvent, and finally distilling the dicyclohexylcarbodiimide under vacuum.

3. The method of preparing dicyclohexylcarbodiimide which consists in reacting p-toluene sulfochloride, in the presence of pyridine, with dicyclohexylurea, heating up to about 80° C., cooling, then separating the pyridine salts by precipitation and removing the excess unreacted p-toluene sulfochloride, and finally separating the resultant dicyclohexylcarbodiimide by distillation in vacuo.

4. The method according to claim 3, using petroleum ether for eliminating the pyridine salts.

5. The method according to claim 3, destroying the excess p-toluene sulfochloride by boiling with diethylamine.

No references cited.